United States Patent Office 3,677,844
Patented July 18, 1972

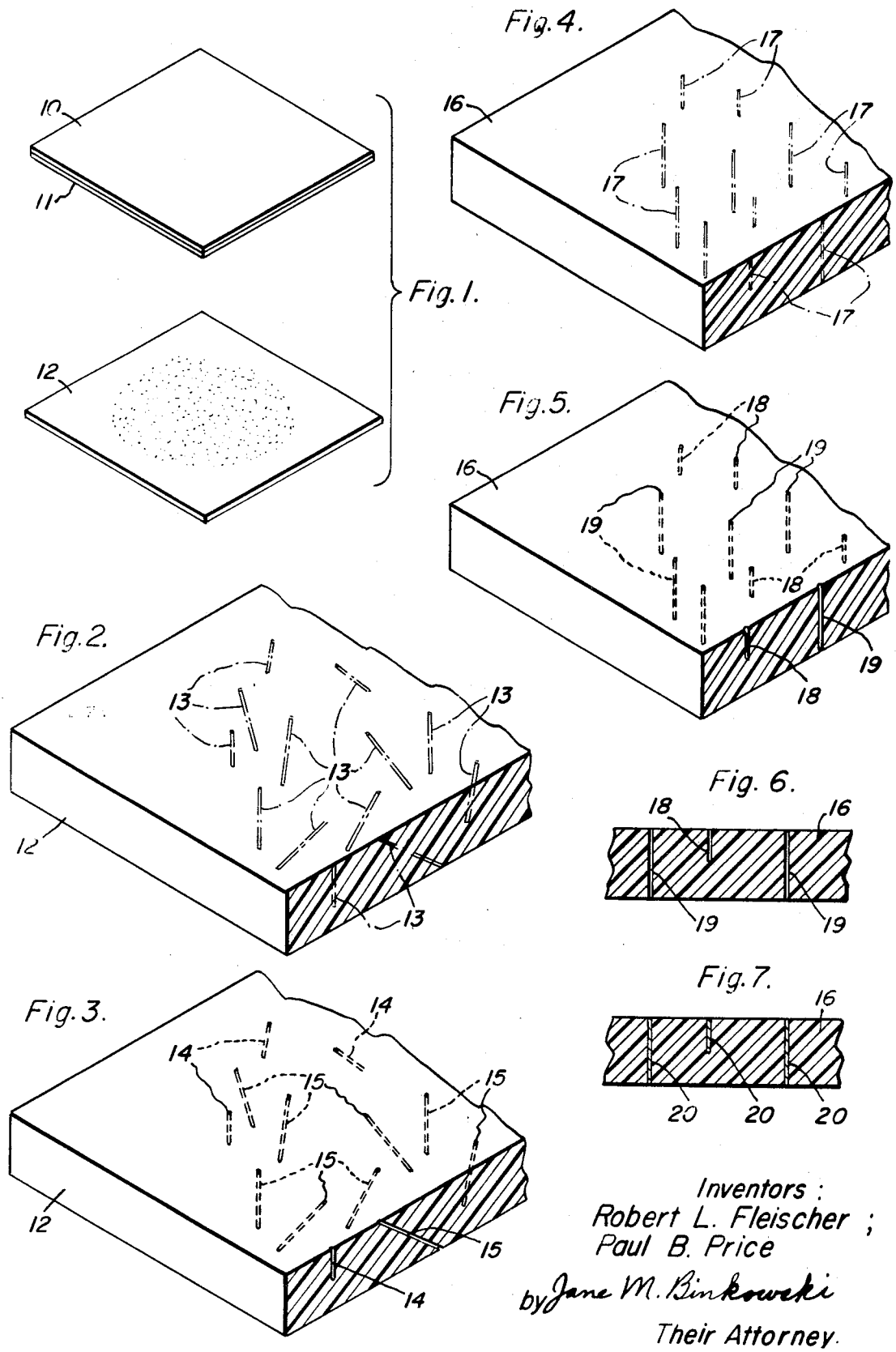

3,677,844
PROCESS FOR MAKING AN ELASTIC STRETCHY SHEET CONTAINING APERTURES HAVING A DIAMETER OF AT LEAST FIVE ANGSTROMS AND BEING SUITABLE AS A MOLECULAR SIEVE
Robert L. Fleischer and Paul B. Price, Schenectady, N.Y., assignors to General Electric Company
Continuation of abandoned application Ser. No. 702,366, Feb. 1, 1968. This application Nov. 19, 1970, Ser. No. 91,140
Int. Cl. B29d 7/20
U.S. Cl. 156—2                     7 Claims

ABSTRACT OF THE DISCLOSURE

A shaped copolymer comprised of etchable polymer and unetchable polymer contributing desired properties to the copolymer is bombarded with charged particles. As the particles pass through the shaped copolymer, they form substantially straight tracks of damaged copolymer. The bombardment of the copolymer with the individual charged particles is so highly localized that it damages only the track defining portions of the copolymer, leaving the remainder of the copolymer substantially unaffected. The copolymer is then contacted with an agent to etch, i.e. extract, the tracks of damaged copolymer, and any additional desired portion of adjacent undamaged copolymer, leaving a substantial number of recesses or apertures depending upon the particular bombarding procedure and the thickness of the copolymer. The aperture-containing copolymer product of the present invention includes properties usually associated with non-etchable polymer. It is useful as a filter.

---

This application is a continuation of Ser. No. 702,366, filed Feb. 1, 1968, and now abandoned.

U.S. Pat. No. 3,303,085 discloses the bombardment of a material with charged particles. As the particles pass through the material, they leave substantially straight tracks of damaged material. This damaged material dissolves, i.e. etches, more readily than the undamaged material. Therefore, upon contacting the bombarded material with a suitable reagent, the damaged material is extracted leaving recesses or apertures in the material.

As disclosed in U.S. Pat. No. 3,303,085, the process can be regulated to produce apertures or recesses in the material depending upon the bombarding procedure and the thickness of the material. The extracted materials have a number of uses such as, for example, filters.

The disclosed process is operable with a number of polymers in which tracks are formed and the track-defining damaged polymer extracted by etching. These polymers are referred to herein as track etchable polymers. Typical examples of such polymers are the polycarbonates which are generally linear aromatic polyesters of carbonic acid and bis($\alpha$-hydroxyphenyl) alkanes. These polymers are thermoplastics with high heat distortion temperatures, excellent dimensional stability and high tensile strengths, which make them suitable for a number of applications. One of the most commercially important polycarbonates ("Lexan") is formed from 2,2-bis(4-hydroxyphenyl) propane ("Bisphenol A").

Additional examples of track etchable polymers are polyethylene terephthalate ("Mylar"), crystalline polyethylene, polystyrene, and the cellulose esters such as the nitrate, acetate and butyrate.

There are certain polymers, however, which are substantially not track etchable and are referred to herein as unetchable polymers. For example, some polymers, such as polytetrafluoroethylene (Teflon), are so chemically inert that even their track defining damaged portions are substantially not etchable. On the other hand, certain polymers, such as elastomers, are degraded or turned to gum by some etchants and are so inert in other etchants that even their track-damaged portions are not etchable. Typical of these elastomers is polydimethylsiloxane.

The unetchable polymers have properties which make them useful for a number of applications. In addition to its inertness, polytetrafluoroethylene is flexible over a wide temperature range. Polydimethylsiloxane, on the other hand, is inert in a number of solvents and has good elastomeric properties.

The present invention makes possible the use of unetchable polymers. Specifically, a track etchable copolymer is used comprised of track etchable polymer and unetchable polymer.

The present invention will be better understood from the following description taken in connection with the accompanying drawings wherein FIG. 1 is a composite view in perspective illustrating one method of bombarding a copolymer sheet with charged particles.

FIG. 2 is an enlarged fragmentary view of the bombarded copolymer sheet of FIG. 1 after the bombardment is carried out in air.

FIG. 3 is a view similar to FIG. 2 showing the FIG. 2 sheet after the track-defining portions of the copolymer have been etched.

FIG. 4 is a fragmentary, enlarged, perspective view of a copolymer sheet produced by the FIG. 1 process when it is carried out in a vacuum or using collimation of the fission fragments showing the tracks as substantially parallel.

FIG. 5 is a view similar to FIG. 4 showing the FIG. 4 sheet after the track-defining portions of the copolymer have been etched.

FIG. 6 is a fragmentary, cross-sectional view of the sheet of FIG. 5.

FIG. 7 is a view similar to FIG. 6 showing the recesses and apertures filled with a foreign material.

The instant etchable copolymer can contain the unetchable polymer in an amount within a wide range. For example, the copolymer can include the unetchable polymer in a minor amount, generally at least about 1 percent, to modify certain properties such as flexibility of the etchable polymer. On the other hand, the etchable copolymer can contain the unetchable polymer in a major amount as long as the copolymer itself remains track etchable. Generally, the maximum amount of unetchable polymer contained in the copolymer is about 90 percent. The specific composition of the etchable copolymer depends upon the particular properties desired.

The etchable copolymers of the present invention can be prepared in a conventional manner and many are commercially available. A typical example of such a copolymer is an organopolysiloxane-polycarbonate block copolymer disclosed in U.S. Pat. No. 3,189,662.

In carrying out the instant invention, the etchable copolymer is formed into the desired shape by any conventional technique prior to bombardment. For most applications, it is shaped into the form of a sheet. The thickness of the sheet will depend largely on its final use and whether a substantial number of recesses or apertures are desired in the extracted sheet. The copolymer sheet need only be thick enough to form a continuous film, generally about one micron. There is no maximum limit on the thickness of the copolymer sheet if it is desired to form only recesses in the sheet. Where apertures are desired in the copolymer sheet, the maximum thickness will depend on the range of the bombarding charged particles and the etchability of the copolymer itself as well as its track defining damaged portions. For a number of copolymers and applications, the maximum thickness may be about 20 microns or higher if fission fragments are used for track formation.

Where the copolymer has elastic properties, thicker sheets can be used, i.e. generally up to about 100 microns. Such a copolymer can be stretched to a suitable thickness, i.e. a thickness conducive to aperture formation, and bombarded in the stretched condition. The stretched bombarded copolymer can then be etched along the tracks of damaged copolymer while in a stretched condition or in its normal unstretched condition.

As used herein, an aperture in the shaped copolymer is a hole extending in a substantially straight line from the bombarded surface through the opposite surface. On the other hand, a recess in the shaped copolymer is a hole extending in a substantially straight line from the bombarded surface and ending within the shaped copolymer.

Any bombarding procedure which will produce the desired tracks in the copolymer sheet can be used. The process can be carried out in air or in a vacuum. Ions and particles which are generated in beams such as argon and oxygen ions and alpha particles are preferred since they produce substantially aligned tracks in the copolymer sheet in air or in a vacuum. On the other hand, particles such as fission fragments of uranium-235 or californium-252 can produce either substantially aligned tracks or random tracks. Improved alignment can be obtained in air with fission fragments by disposing a solid sheet containing a multitude of apertures between the bombarding particles and the copolymer sheet so as to allow passage only of substantially parallel particles.

The particular type of charged particles used to bombard the copolymer sheet will depend largely on the extent to which they form tracks of damaged copolymer since some copolymers are more easily damaged than others. Fission fragments, and ions heavier than oxygen such as argon, will form tracks of damaged copolymer in most copolymers. Oxygen ions are effective with polymers such as the polycarbonates, whereas alpha particles are operable with the more easily damageable polymers such as the cellulose esters.

FIG. 1 illustrates one method of bombarding the copolymer sheet with charged particles. A layer 11 of californium-252 on substrate 10 emits fission fragments, i.e. heavy charged particles, which bombard copolymer sheet 12. The bombarded copolymer sheet 12 is shown in FIG. 2 after the bombardment is carried out in air, showing particle tracks 13 randomly distributed in the copolymer sheet 12 with a number of tracks extending through the sheet and others ending within the sheet. FIG. 3 shows the sheet 12 after its track-defining portions have been etched leaving recesses 14 and apertures 15 extending through it, i.e. the apertures extending from the bombarded surface through the opposite surface.

The bombarded copolymer sheet 16 of FIG. 4 was produced by the FIG. 1 process after the bombardment was carried out in a vacuum or in air using collimation of the fission fragments showing the tracks 17 as substantially parallel. FIG. 5 shows the sheet 16 after the track-defining portions of the copolymer have been etched leaving recesses 18 and apertures 19 extending from the bombarded surface through the opposite surface.

The bombarded, track containing copolymer is stable in that its track-defining damaged portions do not become repaired during storage. It can, therefore, be etched at any convenient time.

The etching process to extract the damaged copolymer portions can be carried out in a conventional manner. For example, the track containing copolymer can be immersed in a solution of the etchant until the damaged copolymer is substantially extracted. The remaining copolymer should then be rinsed with water to remove the etchant.

The chemical agent used to extract the damaged copolymer must not significantly affect the remainder of the copolymer. Generally, the agent is a liquid. The particular agent used and its concentration in solution depends on the extractability of the damaged copolymer. Typical agents include hydrofluoric acid, sodium hydroxide, potassium hydroxide, and potassium permanganate.

The structure of the etched copolymer depends on a number of factors. Generally the apertures and recesses are of substantially uniform size. Their cross-sectional area depends largely on the final use of the copolymer. Generally, the cross-sectional diameter may be as low as about 5 angstroms. The maximum cross-sectional diameter depends on the etchability of the copolymer itself as well as the track-defining damaged copolymer. For many copolymers the maximum cross-sectional dimension may be about $3 \times 10^5$ angstroms where fission fragments are used. The recesses and apertures may or may not be aligned, that is disposed with their longitudinal axes substantially parallel to each other. For most applications, it is preferable to have the recesses and apertures in alignment. However, in all cases they extend into the copolymer in a substantially straight line. Specifically they are straight or slightly tapered bores as distinguished from the tortuous passageways characteristic of the expanded Vycor and filter paper articles of the prior art.

Usually the apertures and recesses are of substantially uniform cylindrical shape throughout their length. In some instances, the recesses and apertures may be of tapering or frusto-conical form or of hour-glass form where the etching acts to produce a conical recess along the line of the track and etchant is contacted with one side only or with both sides of the copolymer simultaneously.

The recesses and apertures can be enlarged after extraction of the track-defining damaged copolymer by contacting the copolymer sheet again with etchant. Repeated or extended etching can also be employed to convert deep recesses into apertures.

The etched copolymer of the present invention has numerous uses. For example, to form porous contact lenses the copolymer can be prepared so that it is clear, machinable, slightly elastic and noncrazing. An example of such a copolymer is a polycarbonate-organosiloxane copolymer containing the polycarbonate in an amount of about 75 percent. Heavy ions, i.e. argon, of about 10 m.e.v./nucleon could put etchable tracks through a lens about 0.25 mm. thick.

The aperture containing product of the present invention can be used as a filter. If the filter has moderately elastic properties, it can be mounted on an expandable diaphragm and have the diameter of the apertures adjusted by varying the diameter of the diaphragm so that objects of nearly equal diameter could be separated. Since this filter is reversibly expandable, it can be backwashed following filtration by flushing it with pressurized water while it is in a stretched state. The filter could also be stretched uniaxially to produce elliptical holes which would be especially suitable for separating disc shaped material.

Specifically the filters produced by the present invention may be used as molecular sieves, i.e., to separate molecules of different sizes such as proteins, high polymers, and viruses. In additional, they may be used for water purification and as a calibrated leak for vacuum systems.

The instant copolymer having predominantly recesses can be used for display of particle distributions, such as would be needed in neutron radiography.

For certain applications, the recesses and apertures of the copolymer can be filled as shown in FIG. 7 with a foreign material 20, i.e. a material different from that of the copolymer. The specific material would depend on the properties desired in the final product. For example, they can be filled with superconductive material or with iron particles to produce oriented, single-domain ferromagnetic sheet. They may also be filled to make them suitable for use as an imaging surface for television camera applications.

All parts used herein are by weight unless otherwise noted.

The invention is further illustrated by the following examples.

The copolymers used in the following examples were polydimethylsiloxane-polycarbonate block copolymers prepared substantially as set forth in U.S. Pat. No. 3,189,662. The polycarbonate was the intercondensation product of 2,2-bis(4-hydroxyphenyl) propane and phosgene. The copolymer films were cast from a methylene chloride solution.

Apertures and recesses in the copolymer sheets of the following examples were measured through a high powered microscope which was calibrated by looking at a finely ruled scale.

Example 1

In this example a 65% polydimethylsiloxane-35% polycarbonate block copolymer sheet having a thickness of 8 microns was used.

The bombardment was carried out in a vacuum of 1 mm. Hg. A layer of californium-252 deposited on a platinum disc was used to provide fission fragments. The copolymer sheet was located about two inches from the californium-252 source for 15 minutes to give an irradiation of $10^5$ cm.$^2$.

The copolymer sheet was then immersed in a 6 normal sodium hydroxide solution maintained at a temperature of 55° C. for about 12 minutes.

The sheet was then removed from the solution, rinsed off with water and dried.

The thickness of the copolymer sheet had been reduced by the sodium hydroxide solution uniformly by about 2 microns. The copolymer sheet had a number of substantially parallel and straight apertures. The apertures measured about 20,000 angstroms in diameter. Sheet porosity, determined by counting the apertures per square cm. under a microscope, measured about 0.1 percent.

The sheet also contained a number of recesses which measured about 20,000 angstroms in diameter.

In the following tabulated Examples 2, 3 and 4, the copolymer sheets were bombarded with fission fragments.

| Example | Copolymer | Properties |
|---|---|---|
| 2 | 65% polydimethylsiloxane, 35% polycarbonate. | Glass clear, very rubbery. |
| 3 | 51% polydimethylsiloxane, 49% polycarbonate. | Glass clear, stretchable. |
| 4 | 25% polydimethylsiloxane, 75% polycarbonate. | Glass clear, craze resistant. |

The bombarded sheets of Examples 2, 3 and 4 were immersed in a 6.25 N sodium hydroxide solution maintained at 80° C. At the end of 10 minutes, the sheets were removed from the etching solution, washed with water and dried.

Each sheet contained a number of hollow tracks.

Example 5

A 65% polydimethylsiloxane-35% polycarbonate copolymer having an intrinsic viscosity of 1.45 deciliters/gm. in chloroform was used.

The copolymer sheet was about 70 microns thick, and 2 cm. by 2 cm. It was stretched on a mandrel with uniform biaxial stress to a thickness of 15 microns and was bombarded with fission fragments in the manner set forth in Example 1. It was then removed from the mandrel and etched, washed and dried as set forth in Example 1. The etched copolymer had a number of substantially straight parallel apertures which measured about 20,000 angstroms in diameter.

The above procedure was repeated with a second copolymer sheet of the same composition except that, in this instance, it was etched while in the stretched condition. The etched copolymer, in its stretched condition, had a number of substantially straight parallel apertures which measured about 20,000 angstroms. After relaxing, the apertures measured 7,000 A.

The sheet which was etched while stretched had a rough surface whereas the sheet etched in relaxed condition retained its substantially smooth surface.

Example 6

In this example, a copolymer sheet having a predominant amount of recesses was prepared.

The procedure used was the same as that set forth in Example 1 except that the copolymer sheet had a thickness of 30 microns.

The resulting extracted copolymer sheet was determined to have a predominant amount of recesses having a cross-sectional diameter of about 20,000 angstroms.

What we claim as new and desire to secure by Letters Patent of the United States is:

1. A process for making an elastic stretchy sheet suitable as a molecular sieve with apertures extending therethrough having a diameter of at least about five angstroms comprising providing an elastic stretchy copolymer in the form of a sheet, stretching said sheet to reduce its thickness without significantly deteriorating its elasticity, said reduced thickness being sufficiently small to allow charged particles to form tracks of damaged copolymer through the copolymer sheet, bombarding a surface of said stretched sheet with charged particles selected from the group consisting of fission fragments, ions heavier than alpha particles and alpha particles to produce substantially straight, substantially parallel charged particle tracks of damaged copolymer in said sheet extending through said sheet from the bombarded surface through the opposite surface, contacting the resulting bombarded sheet in said stretched condition or in its normal unstretched condition with an etchant to dissolve and remove said tracks of damaged copolymer to produce said apertures, and rinsing said sheet to remove said etchant, said elastic stretchy copolymer being copolymerized from a first organic constituent characterized in solid homopolymeric form as thermoplastic and a second constituent characterized in solid homopolymeric form as an elastomer, said first constituent being copolymerized in an amount which ranges from 10 to 99 percent by weight of said copolymer and which is effective in said copolymer to make said charged particle tracks therein dissolvable and removable by contacting said sheet with an etchant selected from the group consisting of hydrofluoric acid, sodium hydroxide, potassium hydroxide and potassium permanganate, and said second constituent being copolymerized in an amount which ranges from 1 to 90 percent by weight of said copolymer and which is effective in making said copolymer elastic and stretchy.

2. A process according to claim 1 wherein said elastic stretchy copolymer is a block copolymer and said charged particles are fission fragments.

3. A process according to claim 2 wherein said solid homopolymeric form of said first constituent is selected from the group consisting of polycarbonate, polyethylene terephthalate, crystalline polyethylene, polystyrene, cellulose nitrate and cellulose butyrate.

4. A process according to claim 3 wherein said block copolymer is a polydimethylsiloxane-polycarbonate block copolymer.

5. A process according to claim 2 wherein said sheet has a maximum thickness of about 100 microns.

6. A process according to claim 5 wherein said bombarded stretched sheet is maintained in said stretched condition while contacted with said etchant.

7. A process for making an elastic stretchy sheet containing apertures having a diameter of at least five angstroms and being suitable as a molecular sieve, comprising providing an elastic stretchy block copolymer of 25 to 65 percent by weight polydimethylsiloxane and 35 to 75 percent by weight polycarbonate in the form of a sheet, stretching said sheet to reduce its thickness without significantly deteriorating its elasticity, said reduced thickness being sufficiently small to allow fission fragments to form tracks of damaged copolymer through the copolymer sheet, bombarding a surface of said stretched sheet with fission fragments to produce substantially straight substantially parallel charged particle tracks of damaged copolymer in said sheet extending through said sheet from the bombarded surface through the opposite surface, contacting the resulting bombarded sheet in said stretched condition or in its normal unstretched condition with an etchant selected from the group consisting of hydrofluoric acid, sodium hydroxide, potassium hydroxide and potassium permanganate to dissolve and remove said tracks of damaged copolymer to produce said apertures, and rinsing said sheet to remove said etchant.

References Cited

UNITED STATES PATENTS

| | | | |
|---|---|---|---|
| 2,950,266 | 8/1960 | Goldblum | 260—43 |
| 3,335,278 | 8/1967 | Price et al. | 250—83.1 |
| 3,373,683 | 3/1968 | Alter | 101—129 |
| 2,950,266 | 8/1960 | Goldblum | 161—183 |
| 2,989,385 | 6/1961 | Gianola et al. | 156—8 |
| 3,189,662 | 6/1965 | Vaughn | 260—824 |
| 3,303,085 | 2/1967 | Price et al. | 156—7 |

OTHER REFERENCES

Margerison, D., et al., Introduction to Polymer Chemistry, Pergamon (New York), 1967, pp. 262 and 263 relied on.

Glasstone, S., Textbook of Physical Chemistry, 2nd ed., D. Van Nostrand (New York), 1946. p. 2 relied on.

ROBERT F. BURNETT, Primary Examiner

J. C. GIL, Assistant Examiner

U.S. Cl. X.R.

55—389, 522; 161—109; 250—83 CD; 264—22, 232, 340